DECIMAL TO BINARY CONVERSION AND STORAGE SYSTEM
Filed April 21, 1960
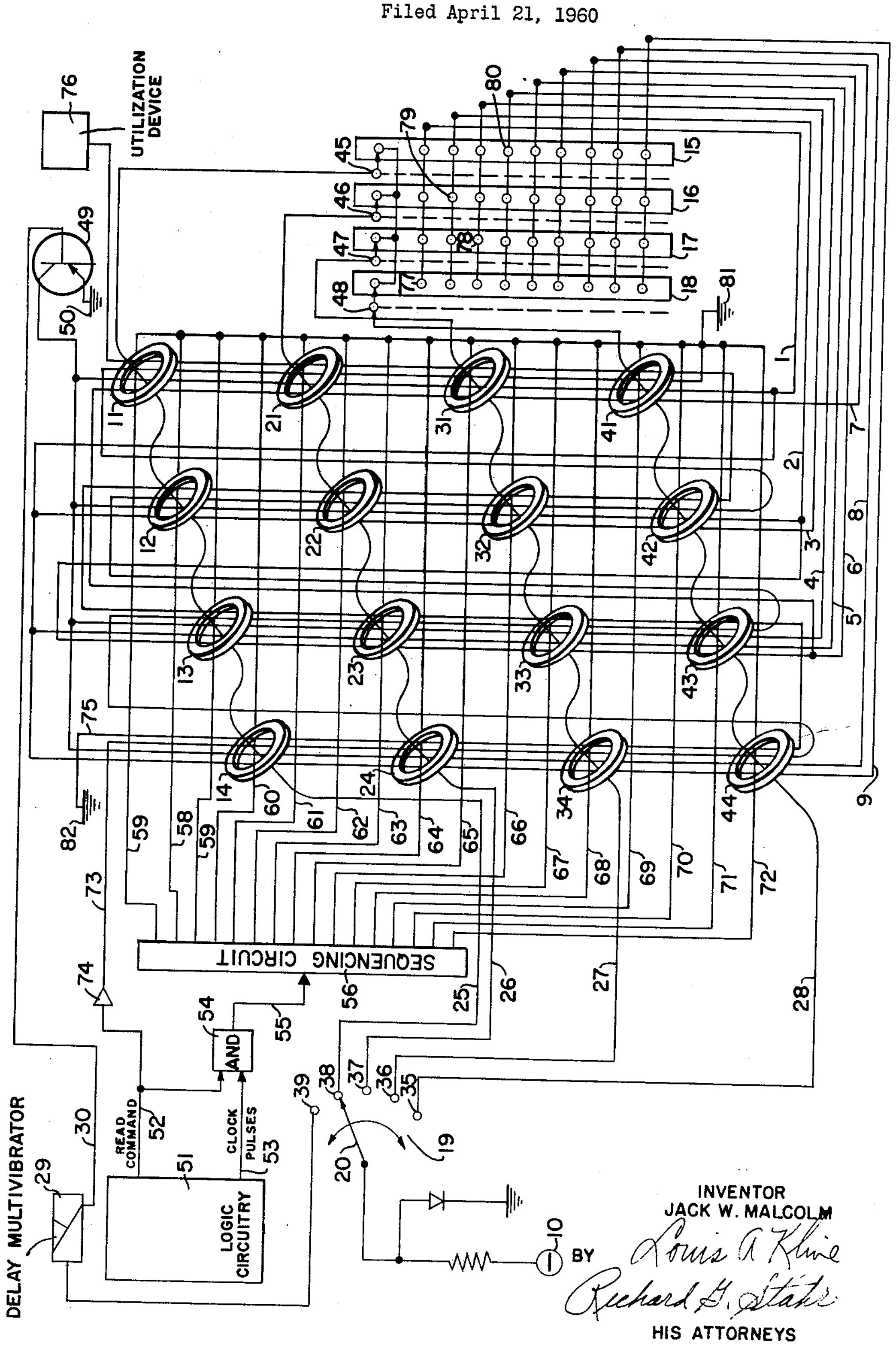
INVENTOR
JACK W. MALCOLM
BY Louis A Kline
Richard G. Stahr
HIS ATTORNEYS United States Patent Office 3,087,149

Patented Apr. 23, 1963

3,087,149
DECIMAL TO BINARY CONVERSION AND STORAGE SYSTEM

Jack W. Malcolm, Gettysburg, Pa., assignor to The National Cash Register Company, Dayton, Ohio, a corporation of Maryland Filed Apr. 21, 1960, Ser. No. 23,831
8 Claims. (Cl. 340—347)

The present invention relates to code translating devices and, more specifically, to a system for converting single polarity signal representations of characters into respective two polarity bit binary code representations and storing the converted representations.

As modern data-processing equipment most frequently operates exclusively in the binary mode, various devices have heretofore been proposed for the purpose of converting letters of the alphabet and decimal numerals into binary code representations and vice versa. While decimal numerals may be represented by four bit per group binary codes, seven or eight bit per group codes are not uncommon and are, in fact, mandatory when letters of the alphabet are involved.

In prior art devices, diode-resistance matrices in various switching arrangements have been employed. As the number of bits per group of the binary code representations increase, the switching circuitry of matrices of this type becomes increasingly complex. Complex circuitry, of necessity, involves numerous components, with the attendant disadvantages of prohibitively expensive manufacturing and maintenance costs in addition to undesirable and frequently intolerable space requirements.

As the use of digital data-processing equipment is becoming increasingly widespread, the requirement of a simple conversion device which occupies a minimum of space is apparent.

It is, therefore, an object of this invention to provide an improved converter device.

It is another object of this invention to provide an improved converter device employing binary elements.

It is a further object of this invention to provide an improved system for converting single polarity signal representations of characters into respective two polarity bit binary code representations and storing the converted representations.

It is an additional object of this invention to provide an improved system for converting single polarity signal representations of characters into respective two polarity bit binary code representations utilizing only the single polarity signal energy.

In accordance with this invention, an improved code converter device is provided wherein a plurality of binary elements, each characterized by two stable conditions of operation, are arranged in a plurality of groups of an equal number of elements per group wherein the groups correspond to characters, each element per group corresponds to a respective bit position of a binary code, and a selected one of the stable conditions of operation of any member in each group denotes the presence of a significant bit in that position whereby each group may represent each one of a plurality of characters by producing, for each specific character, that stable condition of operation selected to denote the presence of significant bits in those members within the group which correspond to the bit positions of the binary code representation of the specific character to be represented by the group in which the significant bits are present. The energization, by a single polarity signal, of any of the individual first input circuits, which series-couples all of the elements of each respective group, and a series-connected second input circuit, which corresponds to a specific character and which further series-couples those elements of all of the groups which correspond to the bit positions of the binary code representation of that specific character in which the significant bits are present, in a sense for producing that stable condition of operation selected to denote the presence of significant bits, produces that condition of operation in those members of the group which correspond to the positions of the binary code occupied by the significant bits. The first readout circuits, which are coupled to each element individually, are successively energized by a readout pulse coincidentally with a second readout circuit, which series-couples all of the elements, in a sense opposite that of the single polarity signal. As the condition of operation of those elements corresponding to the significant bits is reversed by the readout pulses, a series of pulses appear in an output circuit which is series-coupled to all of the elements.

For a better understanding of the present invention, together with further objects, advantages, and features thereof, reference is made to the following description and accompanying single-figure drawing.

The device of this invention may be employed with any application which requires the conversion of numerical digits and/or letters of the alphabet into binary code representations. For purposes of this specification, however, and without intention or inference of a limitation thereto, the features of the novel device of this invention will be described relative to one of numerous embodiments. One example of an application with which the device of this invention may be employed may be found in the accounting machine field, where it is frequently necessary to convert single polarity signal representations of decimal values into binary code representations of the same values. The input device of equipment of this type may be of any suitable type selector switch; for example, a keyboard which may have a plurality of keys arranged in columns wherein each column correponds to a different order of value and has one key for each numerical digit, 1 through 9, inclusive. With keyboards of this type, the extreme right column of keys generally corresponds to the lowest order of value, or units; the next column to the left corresponds to the next higher order of value, or tens; the third column to the left corresponds to the next higher order of value, or hundreds; and so on. For example, the depression of the key for the digit 3 in the column corresponding to the lowest order of value, the key for the digit 5 in the column corresponding to the next higher order, and the key for the digit 9 in the column corresponding to the next higher order would denote the decimal value 953.

As any of the keys of a keyboard of this type is depressed, the contacts of an associated switch are directly or indirectly closed, which completes an electrical path from an input circuit common to the column containing the depressed key to an output circuit peculiar to the digit represented by the depressed key. That is, there are nine separate output circuits from the keyboard-controlled switches, each of which corresponds to a respective numerical digit 1 through 9, inclusive. The presence of a single polarity signal upon any one of these lines, therefore, is a single polarity signal representation of the numerical digit to which that line corresponds. The device of this invention may be employed to convert these single polarity signal representations into binary code representations of the same values which are compatible with associated arithmetic units.

In the binary coded decimal system, a positional sequence or group expresses decimal values, the consecutive positions in the group representing coefficients of corresponding powers of the base 2. In this system, either one of the end positions of the group may be selected to represent the coefficient of least significant power, with each successive position thereafter representing the coefficient of the next higher power. That is, the position selected to represent the coefficient of the least significant power represents the numerical digit 1, the coefficient of $2^0$, with each succeeding position representing, respectively, the numerical digit 2, the coefficient of $2^1$; the numerical digit 4, the coefficient of $2^2$; the numerical digit 8, the coefficient of $2^3$; and so on. Each position of the group is occupied by an information bit of either one of two polarities, usually termed "mark" and "space" bits, either one of which may be selected to be significant. The presence of a significant bit in any position of the group expresses the decimal value of the coefficient of the corresponding power of the base 2 represented by that position, and the presence of significant bits in any combination of positions of the group expresses the decimal value of the sum of the coefficients of the corresponding powers of 2 represented by those positions. For example, the presence of significant bits in the first and fourth positions of the binary coded decimal group expresses the decimal value 9, the sum of 1 and 8, or the presence of significant bits in the first, second, and third positions expresses the decimal value 7, the sum of 1, 2, and 4.

For purposes of this specification, the right end bit position of the group will be selected to represent the coefficient of the least significant power of the base 2 and will hereinafter be referred to as the "least significant position"; the "mark" polarity bits will be selected to be significant and will be evidenced by the presence of a signal pulse, while the "space" polarity bits will be evidenced by the absence of a pulse.

In the interest of reducing drawing complexity and without intention or inference of a limitation to the invention, it will be assumed for purposes of illustration only that the input device used with the converter of this invention includes a keyboard-controlled switch having four columns of contacts 15, 16, 17, and 18, each indicated in schematic form, where column 15 corresponds to the lowest order of value, or units, and that the four bit per group binary coded decimal system has been selected to be used with the associated arithmetic units.

Basically, the device of this invention comprises a plurality of binary elements, each characterized by two stable conditions of operation, which may be arranged in a plurality of groups of an equal number of elements per group wherein the groups correspond to characters, in this instance decimal digits, and each element per group corresponds to a respective bit position of the binary code selected. Consistent with the assumptions hereinbefore outlined, the binary elements may be arranged into four groups, one for each column of keys on the keyboard, of four elements per group, one for each respective bit position of the four bit per group binary coded decimal system. While any binary element possessing two stable conditions of operation may be employed, these elements have herein been illustrated as magnetic cores 11, 12, 13, and 14 for the group corresponding to denominational column 15; 21, 22, 23, and 24 for the group corresponding to denominational column 16; 31, 32, 33, and 34 for the group corresponding to denominational column 17; and 41, 42, 43, and 44 for the group corresponding to denominational column 18. These magnetic cores are composed of a material having substantially square hysteresis loop characteristics and have been indicated as being toroidal in shape in the figure; however, it is to be specifically understood that any other suitable shape or form may be employed. With this arrangement, cores 11, 21, 31, and 41 correspond to the least significant bit position, and cores 14, 24, 34, and 44 correspond to the most significant bit position of the four bit per group binary coded decimal system.

As is well known in the art, magnetic cores composed of a material having substantially square hysteresis loop characteristics possess the property of two stable conditions of operation or magnetic remanence. These stable conditions of operation are generally referred to as the "1" and the "0" conditions and will hereinafter be referred to as such. As either one of the stable conditions of operation may be selected to denote the presence of significant or "mark" polarity bits, for purposes of this specification, the "1" condition of operation will be so selected. Therefore, the "1" condition of operation or magnetic remanence in any of the magnetic cores denotes the presence of a significant or "mark" polarity bit in the position of the binary code group to which that core corresponds. For example, the "1" condition of operation of magnetic core 23 denotes the presence of a "mark" polarity bit in the third position of the binary code group. Similarly, the "1" condition of operation of magnetic core 42 denotes the presence of a "mark" polarity bit in the second position of the binary code group.

Individually coupling in series all of the members of each group is an individual first input circuit for each group, indicated as coils 25, 26, 27, and 28, each of which is coupled to all of the cores of its respective group by respective coupling windings, each of which is herein indicated as a single turn. These individual input circuit coils are connected to a source of negative polarity potential 10 through selector switch 19, the operation of which will be described in detail later. The sense of the coupling windings of these coils is arranged to produce the "1" condition of operation in the cores coupled thereby when energized by source 10.

A second input circuit corresponding to each different character, or numerical digit in this instance, series couples, in a sense the same as the first input circuits, those cores of all of the groups which correspond to the bit positions of the binary code representations of the respective characters in which are present significant bits. As only decimal digits are involved for purposes of this specification, there are nine separate second input circuits, indicated as coils 1, 2, 3, 4, 5, 6, 7, 8, and 9, respectively, each corresponding to a different decimal digit. Each of these second input circuit coils is coupled to those cores of all the groups which correspond to the bit positions of the binary code representation of the digit to which it corresponds by respective coupling windings each herein indicated as a single turn. For example, the binary code representation of the decimal digit 9 is the presence of a significant or "mark" polarity bit in the first and fourth bit positions. Therefore, second input circuit coil 9 series-couples those cores of all the groups corresponding to the first bit position, cores 11, 21, 31, and 41, and those cores of all of the groups which correspond to the fourth bit position, cores 14, 24, 34, and 44. Similarly, the binary code representation of the decimal digit 6 is the presence of a significance or "mark" polarity bit in the second and third bit positions. Therefore, second input circuit coil 6 series-couples those cores of all of the groups which correspond to the second bit position, cores 12, 22, 32, and 42, and all of those cores which correspond to the third bit position, or elements 13, 23, 33, and 43. The remainder of the second input circuit coils similarly series-couple the proper cores, as indicated.

To successively direct the single polarity signal from source 10 individually to each of the first input circuit coils, a rotary selector switch 19 is employed. While switch 19 is herein indicated to be a mechanical switch, the practice of this invention is not necessarily limited thereto. The wiper arm 20 of switch 19 is operated by a cam mechanism contained within the input device used, and successively wipes terminals 35, 36, 37, 38, and 39.

Located between and serving to connect the first and second input circuits in series is a switching device, including an individual output circuit for each different character, for transforming the single polarity signals emanating from source 10 into single polarity signal representations of the respective characters by directing the single polarity signal from source 10 to the output circuit thereof which corresponds to a selected character. While this switching device may be any suitable selector type switch, in the present embodiment it is the keyboard-operated selector type switch of the input device previously described. Each key of the keyboard has an associated stationary contact, typically indicated as small circles, and each of the columns 15, 16, 17, and 18 has a respective associated movable contact 45, 46, 47, and 48, to each of which is connected a respective first input coil 25, 26, 27, and 28, whereby each group of cores corresponds to a respective column of keys. Since only one digit may be selected in any one column of keys at any one time, it follows that each group of cores thereby corresponds to any one character. As any key is depressed, the movable contact associated with the column in which the depressed key is located is placed in a connecting relationship with the stationary contact associated with the depressed key, thereby completing a circuit therethrough from the first input circuit coil corresponding to that column to the output circuit which corresponds to the decimal numeral selected. For example, should the decimal value 1324 be entered into the keyboard, the digit keys 1, 3, 2, and 4 of respective columns, 18, 17, 16, and 15 would be depressed. Under these conditions, movable contact 48 of column 18 completes a series electrical circuit through stationary contact 77 of column 18 from first input circuit coil 28 to the second input circuit coil corresponding to the decimal digit 1; movable contact 47 of column 17 completes a series electrical circuit through stationary contact 78 of column 17 from the first input circuit coil 27 to the second input circuit coil corresponding to the decimal digit 3; movable contact 46 of column 16 completes a series electrical circuit through stationary contact 79 of column 16 from first input circuit coil 26 to the second input circuit coil corresponding to the decimal digit 2; and movable contact 45 of column 15 completes a series electrical circuit through stationary contact 80 of column 15 from first input circuit coil 25 to the second input circuit coil corresponding to the decimal digit 4. Through this switching device, therefore, the first and second input circuits are connected in series and are both energized by the same signal emanating from signal source 10.

By depressing an operate key on the input device, wiper arm 20 of switch 19 is activated and initially wipes contact 35. This completes a series electrical circuit from single polarity signal source 10 through switch 19, first input circuit coil 28, movable contact 48 and stationary contact 77 of column 18, second input circuit coil 1, transistor 49 to point of reference potential or ground 50. As cores 41, 42, 43, and 44 of the fourth group and cores 11, 21, 31, and 41 of each of the groups are series-coupled by the input coils included in this circuit, the coupling windings of each is energized in a sense for producing therein the stable condition of operation selected to denote the presence of a "mark" polarity bit, in this instance the "1" condition. However, to produce the stable condition of operation "1," it is required that a core be coupled by two input coils which are coincidentally energized by signal energy from source 10 to produce the required ampere-turns of energy to cause the reversal of operation. The only core which is coupled by two coincidentally-energized input coils is core 41, of the fourth group; therefore, it is the only core which will have its stable condition of operation set in the "1" state denoting the presence of a significant or "mark" polarity bit in the first position, which is the binary coded decimal representation of the decimal digit 1. Similarly, as wiper arm 20 advances to terminal 36, a series electrical circuit is completed from single polarity signal source 10 through selector switch 19, first input circuit coil 27, movable contact 47 and stationary contact 78 of column 17, second input circuit coil 3, transistor 49 to ground 50. Cores 31, 32, 33, and 34 of the third group and cores 12, 22, 32, 42, 11, 21, 31, and 41 of each of the groups are coupled by the input coils included in this circuit. In this instance, only cores 31 and 32 of the third group are coupled by two coincidentally energized input coils; therefore, only cores 31 and 32 will be set in the "1" stable condition of operation denoting the presence of significant or "mark" polarity bits in the first and second positions, which is the binary coded decimal representation of the decimal digit 3. By similarly tracing the series circuits energized as wiper arm 20 successively wipes contacts 37 and 38, it may be determined that only core 22 of the second group is placed in the "1" condition of operation denoting the presence of a "mark" polarity bit in the second position, which is the binary coded decimal representation of the decimal digit 2, while only core 13 of the first group is placed in the "1" condition of operation denoting the presence of a "mark" polarity bit in the third position, which is the binary coded decimal representation of the decimal digit 4. In this manner, therefore, single polarity signal representations of decimal values are converted into binary coded decimal representations of the same values and are stored in the magnetic cores until they are required by external circuitry.

As wiper arm 20 advances to terminal 39, a circuit is completed from signal source 10 through terminal 39 to a delay multivibrator 29, which, since the details form no part of this invention and are well known in the art, is indicated in block form. Delay multivibrators of this type are normally in one stable condition of operation but may be triggered to an alternate state by the application of a selected polarity pulse thereto. These devices are designed to remain in the alternate state for specific periods of time, as determined by the time constant circuit networks contained therein, at the conclusion of which they spontaneously revert to their normal stable state. Output line 30 of delay multivibrator 29 is arranged to be at a negative potential during the period multivibrator 29 is in the normal state, thereby placing a negative potential bias upon the base of transistor 49. However, as delay multivibrator 29 is triggered to its alternate state by the negative signal from source 10, output line 30 goes to ground potential, which is applied to the base of transistor 49. As transistor 49 is a type PNP transistor, the presence of a ground potential upon the base does not satisfy the base-emitter bias requirements for conduction therethrough; hence transistor 49 is cut off. As transistor 49 is cut off, point of reference potential 50 is removed from the input circuits. With ground removed from the input circuits, wiper arm 20 may be returned to its original position without destroying the condition of operation of any of the magnetic cores in the several groups. The delay designed into device 29 is sufficient to permit the resetting of wiper arm 20. After wiper arm 20 has been reset, multivibrator 29 returns to its normal stable state, placing a negative potential upon output line 30 thereof and the base of transistor 49. With a negative bias potential on the base, transistor 49 is biased to conduction, which again places ground upon the input circuits.

Associated with the unit with which the device of this invention is employed is a source of clock pulses and associated logic circuitry. As this circuitry may be of any type well known in the art and forms no part of this invention, it has herein been indicated in block form at reference numeral 51. This circuitry has, among other things, a read command output 52 and a clock pulse output 53. The read command signal appearing on line 52 and clock pulse signals appearing on line 53 are directed to a conventional "AND" gate 54, which, since it is well known in the art and forms no part of this invention, is illustrated in block form. This device may be any suitable two-input "AND" gate circuit which requires the presence of a pulse at both input circuit terminals thereof to produce an output pulse on output circuit 55. The output circuit 55 of "AND" gate 54 is directed to a sequencing circuit 56. Sequencing circuits of this type are well known in the art and are characterized by the ability to direct individual output signals sequentially to a series of output lines and, therefore, have been herein indicated in block form. Examples of suitable sequencing circuits of this type are shift register circuits, ring counter circuits, or the commercially available electronic beam tube switches.

Individual read-out circuits are coupled to respective magnetic cores in a sense opposite that of the first and second input circuits. These individual read-out circuits are indicated at reference numerals 57, 58, 59, 60, 61, 62, 63, 64, 65, 66, 67, 68, 69, 70, 71, and 72, each of which couples a respective one core of the several groups by respective coupling windings each herein indicated as a single turn and completes a circuit from the sequencing circuit device 56 to point of reference potential 81.

A second read-out circuit 73, which is series-coupled to all of the elements by respective coupling windings each herein indicated as a single turn in a sense the same as the first read-out circuit, is also provided and may be traced from read command line 52 through, if required, a conventional amplifier 74, indicated in block form, to point of reference potential 81.

By successively energizing each of the first read-out circuits coincident with the second read-out circuit, those cores of the several groups which are in the "1" stable state, which denotes the presence of significant or "mark" polarity bits, will be individually reversed. Upon the occurrence of a read-out command, read command line 52 becomes energized, which also energizes second read-out circuit 73 through conventional amplifier 74. Simultaneously, one of the input terminals of "AND" gate 54 is energized by read command line 52; therefore, an output pulse will appear in output circuit 55 thereof, with each clock pulse appearing on clock pulse line 53. These pulses are applied to sequencing circuit 56, which is characterized by the ability to place individual successive output pulses upon first read-out circuits 57 through 72, inclusive. In this manner, all of the several magnetic cores are individually interrogated, and those which are in the "1" stable condition of operation, denoting the presence of significant or "mark" polarity bits, are thereby reversed but each at a different time interval.

Serially coupling all of the cores is an output circuit 75, which extends from point of reference potential 82 serially through all of the cores of the several groups and terminates in associated utilization circuitry 76, which may be of any type well known in the art and, therefore, is herein indicated in block form. As any core is reversed from the "1" stable condition of operation to the "0" stable condition of operation, a pulse appears in output circuit 75 and may be taken therefrom and applied to utilization circuitry 76. At the conclusion of the read-out cycle, all of the magnetic cores of the several groups are in the "0" condition of operation and are prepared to receive the next decimal value input.

While specific polarities and conditions of operation have been outlined herein, it is to be specifically understood that the alternate conditions may have been selected without departing from the spirit of the invention.

While a preferred embodiment of this invention has been shown and described, it will be obvious to those skilled in the art that various modifications and substitutions may be made without departing from the spirit of the invention, which is to be limited only within the scope of the appended claims.

What is claimed is:

1. A system for converting single polarity signal representations of characters into respective two polarity bit binary code representations wherein either polarity bit is selected to be significant and storing the converted representations comprising in combination with a source of single polarity signals and a source of read-out signals; a plurality of binary elements, each characterized by two stable conditions of operation, arranged in a plurality of groups of an equal number of elements per group wherein the groups correspond to characters, each element per group corresponds to a respective bit position of a selected binary code, and a selected one of the stable conditions of operation of any element in each group denotes the presence of a significant bit in that position; individual first input circuit means series coupling all of the elements of each respective group in a sense for producing in each element that stable condition of operation selected to denote the presence of a significant bit; a second input circuit means corresponding to each different character series coupling those elements of all of the groups which correspond to the bit positions of the binary code representations of the respective characters in which is present the significant bits in a sense the same as said first input means; individual first read-out circuit means coupling each respective element in a sense opposite that of said first and second input circuit means; second read-out circuit means series coupling all of said elements in a sense the same as said first read-out circuit means whereby a read-out signal successively energizing each of said first read-out circuit means coincident with the said second read-out circuit means will individually reverse the condition of operation of those elements which are in the stable condition of operation selected to denote the presence of a significant bit; and an output circuit means serially coupling all of said elements in which a pulse appears with each reversal of condition of operation of an element.

2. A system for converting single polarity signal representations of characters into respective two polarity bit binary code representations wherein either polarity bit is selected to be significant and storing the converted representations comprising in combination with a source of single polarity signals and a source of read-out signals; a plurality of binary elements, each characterized by two stable conditions of operation, arranged in a plurality of groups of an equal number of elements per group wherein the groups correspond to characters, each element per group corresponds to a respective bit position of a selected binary code, and a selected one of the stable conditions of operation of any element in each group denotes the presence of a significant bit in that position; individual first input circuit means series coupling all of the elements of each respective group in a sense for producing in each element that stable condition of operation selected to denote the presence of a significant bit; a second input circuit means corresponding to each different character series coupling those elements of all of the groups which correspond to the bit positions of the binary code representations of the respective characters in which is present the significant bits in a sense the same as said first input means whereby the coincident energization of respective ones of said first and second input circuit means by a single polarity signal produces that stable condition of operation selected to denote the presence of significant bits in those elements of the group coupled by the energized first circuit means which correspond to the bit positions in which the significant bits are present of the binary code representation of the character to which the energized second circuit means corresponds; individual first read-out circuit means coupling each respective element in a sense opposite that of said first and second input circuit means; second read-out circuit means series coupling all of said elements in a sense the same as said first read-out circuit means whereby a read-out signal successively energizing each of said first read-out circuit means coincident with the said second read-out means will individually reverse the condition of operation of those elements which are in the stable condition of operation selected to denote the presence of a significant bit; and an output circuit means serially coupling all of said elements in which a pulse appears with each reversal of condition of operation of an element.

3. A system for converting single polarity signal representations of characters into respective two polarity bit binary code representations wherein either polarity bit is selected to be significant and storing the converted representations comprising in combination with a source of single polarity signals and a source of read-out signals; a plurality of magnetic cores composed of a material having substantially square hysteresis loop characteristics, each characterized by two stable conditions of operation, arranged in a plurality of groups of an equal number of cores per group wherein the groups correspond to characters, each core per group corresponds to a respective bit position of a selected binary code, and a selected one of the stable conditions of operation of any core in each group denotes the presence of a significant bit in that position; individual first input circuit means series coupling all of the cores of each respective group in a sense for producing in each core that stable condition of operation selected to denote the presence of a significant bit; a second input circuit means corresponding to each different character series coupling those cores of all of the groups which correspond to the bit positions of the binary code representations of the respective characters in which is present the significant bits in a sense the same as said first input means whereby the coincident energization of respective ones of said first and second input circuit means by a single polarity signal produces that stable condition of operation selected to denote the presence of significant bits in those cores of the group coupled by the energized first circuit means which correspond to the bit positions in which the significant bits are present of the binary code representation of the character to which the energized second circuit means corresponds; individual first read-out circuit means coupling each respective core in a sense opposite that of said first and second input circuit means; second read-out circuit means series coupling all of said cores in a sense the same as said first read-out circuit means whereby a read-out signal successively energizing each of said first read-out circuit means coincident with the said second read-out circuit means will individually reverse the condition of operation of those cores which are in the stable condition of operation selected to denote the presence of a significant bit; and an output circuit means serially coupling all of said cores in which a pulse appears with each reversal of condition of operation of a core.

4. A system for converting single polarity signal representations of characters into respective two polarity bit binary code representations wherein either polarity bit is selected to be significant and storing the converted representations comprising in combination with a source of single polarity signals and a source of read-out signals; a plurality of binary elements each characterized by two stable conditions of operation arranged in a plurality of groups of an equal number of elements per group wherein the groups correspond to characters, each element per group corresponds to a respective bit position of a selected binary code, and a selected one of the stable conditions of operation of any element in each group denotes the presence of a significant bit in that position; individual first input circuit means series coupling all of the elements of each respective group in a sense for producing in each element that stable condition of operation selected to denote the presence of a significant bit; a second input circuit means corresponding to each different character series coupling those elements of all of the groups which correspond to the bit positions of the binary code representations of the respective characters in which is present the significant bits in a sense the same as said first input means; means for successively directing a single polarity signal from said single polarity signal source individually to each of said first input circuit means, switching circuit means including an individual output circuit means for each different character located between said first and second input circuit means for connecting said first input circuit means in series with a selected one of said second input circuit means and transforming said single polarity signals into single polarity signal representations of characters by directing said single polarity signals to the output terminal thereof which corresponds to a selected character whereby the selective energization of respective ones of said series connected first and second input circuit means by the same single polarity signal produces that stable condition of operation selected to denote the presence of significant bits in those elements of the group coupled by the energized first circuit means which correspond to the bit positions in which the significant bits are present of the binary code representation of the character to which the energized second circuit means corresponds; individual first read-out circuit means coupling each respective element in a sense opposite that of said first and second input circuit means; second read-out circuit means series coupling all of said elements in a sense the same as said first read-out circuit means whereby a read-out signal successively energizing each of said first read-out circuit means coincident with the said second read-out circuit means will individually reverse the condition of operation of those elements which are in the stable condition of operation selected to denote the presence of a significant bit; and an output circuit means serially coupling all of said elements in which a pulse appears with each reversal of condition of operation of an element.

5. A system for converting single polarity signal representations of characters into respective two polarity bit binary code representations wherein either polarity bit is selected to be significant and storing the converted representations comprising in combination with a source of single polarity signals and a source of read-out signals; a plurality of binary elements each characterized by two stable conditions of operation arranged in a plurality of groups of an equal number of elements per group wherein the groups correspond to characters, each element per group corresponds to a respective bit position of a selected binary code, and a selected one of the stable conditions of operation of any element in each group denotes the presence of a significant bit in that position; individual first input circuit means series coupling all of the elements of each respective group in a sense for producing in each element that stable condition of operation selected to denote the presence of a significant bit; a second input circuit means corresponding to each different character series coupling those elements of all of the groups which correspond to the bit positions of the binary code representations of the respective characters in which is present the significant bits in a sense the same as said first input means; selector switch means for successively directing a single polarity signal from said single polarity signal source individually to each of said first input circuit means; switching circuit means including an individual output circuit means for each different character located between said first and second input circuit means for connecting said first input circuit means in series with a selected one of said second input circuit means and transforming said single polarity signals into single polarity signal representations of characters by directing said single polarity signals to the output terminal thereof which corresponds to a selected character whereby the selective energization of respective ones of said series connected first and second input circuit means by the same single polarity signal produces that stable condition of operation selected to denote the presence of significant bits in those elements of the group coupled by the energized first circuit means which correspond to the bit positions in which the significant bits are present of the binary code representation of the character to which the energized second circuit means corresponds; individual first read-out circuit means coupling each respective element in a sense opposite that of said first and second input circuit means; second read-out circuit means series coupling all of said elements in a sense the same as said first read-out circuit means whereby a read-out signal successively energizing each of said first read-out circuit means coincident with the said second read-out circuit means will individually reverse the condition of operation of those elements which are in the stable condition of operation selected to denote the presence of a significant bit; and an output circuit means serially coupling all of said elements in which a pulse appears with each reversal of condition of operation of an element.

6. A system for converting single polarity signal representations of characters into respective two polarity bit binary code representations wherein either polarity bit is selected to be significant and storing the converted representations comprising in combination with a source of single polarity signals and a source of read-out signals; a plurality of binary elements each characterized by two stable conditions of operation arranged in a plurality of groups of an equal number of elements per group wherein the groups correspond to characters, each element per group corresponds to a respective bit position of a selected binary code, and a selected one of the stable conditions of operation of any element in each group denotes the presence of a significant bit in that position; individual first input circuit means series coupling all of the elements of each respective group in a sense for producing in each element that stable condition of operation selected to denote the presence of a significant bit; a second input circuit means corresponding to each different character series coupling those elements of all of the groups correspond to the bit positions of the binary code representations of the respective characters in which is present the significant bits in a sense the same as said first input means; means for successively directing a single polarity signal from said single polarity signal source individually to each of said first input circuit means; a keyboard device including an individual output circuit means for each different character located between and connected in series with said first and second input circuit means for transforming said single polarity signals into single polarity signal representations of characters by directing said single polarity signals to the output terminal thereof which corresponds to a selected character whereby the selective energization of respective ones of said series connected first and second input circuit means by the same single polarity signal produces that stable condition of operation selected to denote the presence of significant bits in those elements of the group coupled by the energized first circuit means which correspond to the bit positions in which the significant bits are present of the binary code representation of the character to which the energized second circuit means corresponds; individual first read-out circuit means coupling each respective element in a sense opposite that of said first and second input circuit means; second read-out circuit means series coupling all of said elements in a sense the same as said first read-out circuit means whereby a read-out signal successively energizing each of said first read-out circuit means coincident with the said second read-out circuit means will individually reverse the condition of operation of those elements which are in the stable condition of operation selected to denote the presence of a significant bit; and an output circuit means serially coupling all of said elements in which a pulse appears with each reversal of condition of operation of an element.

7. A system for converting single polarity signal representations of characters into respective two polarity bit binary code representations wherein either polarity bit is selected to be significant and storing the converted representations comprising in combination with a source of single polarity signals and a source of read-out signals; a plurality of magnetic cores composed of a material having substantially square hysteresis loop characteristics, each characterized by two stable conditions of operation, arranged in a plurality of groups of an equal number of cores per group wherein the groups correspond to characters, each core per group corresponds to a respective bit position of a selected binary code, and a selected one of the stable conditions of operation of any core in each group denotes the presence of a significant bit in that position; individual first input circuit means series coupling all of the cores of each respective group in a sense for producing in each core that stable condition of operation selected to denote the presence of a significant bit; a second input circuit means corresponding to each different character series coupling those cores of all of the groups which correspond to the bit positions of the binary code representations of the respective characters in which is present the significant bits in a sense the same as said first input means; means for successively directing a single polarity signal from said single polarity signal source individually to each of said first input circuit means; switching circuit means including an individual output circuit means for each different character located between and connected in series with said first and second input circuit means for transforming said single polarity signals into single polarity signal representations of characters by directing said single polarity signals to the output terminal thereof which corresponds to a selected character whereby the selective energization of respective ones of said series connected first and second input circuit means by the same single polarity signal produces that stable condition of operation selected to denote the presence of significant bits in those cores of the group coupled by the energized first circuit means which corresponds to the bit positions in which the significant bits are present of the binary code representation of the character to which the energized second circuit means corresponds; individual first read-out circuit means coupling each respective core in a sense opposite that of said first and second input circuit means; second read-out circuit means series coupling all of said cores in a sense the same as said first read-out circuit means whereby a read-out signal successively energizing each of said first read-out circuit means coincident with the said second read-out circuit means will individually reverse the condition of operation of those cores which are in the stable condition of operation selected to denote the presence of a significant bit; and an output circuit means serially coupling all of said cores in which a pulse appears with each reversal of condition of operation of a core.

8. A system for converting single polarity signal representations of characters into respective two polarity bit binary code representations wherein either polarity bit is selected to be significant and storing the converted representations comprising in combination with a source of single polarity signals and a source of read-out signals; a plurality of magnetic cores composed of a material having substantially square hysteresis loop characteristics, each characterized by two stable conditions of operation, arranged in a plurality of groups of an equal number of cores per group wherein the groups correspond to characters, each core per group corresponds to a respective bit position of a selected binary code, and a selected one of the stable conditions of operation of any core in each group denotes the presence of a significant bit in that position; individual first input circuit means series coupling all of the cores of each respective group in a sense for producing in each core that stable condition of operation selected to denote the presence of a significant bit; a second input circuit means corresponding to each different character series coupling those cores of all of the groups which correspond to the bit positions of the binary code representations of the respective characters in which is present the significant bits in a sense the same as said first input means; selector switch means for successively directing a single polarity signal from said single polarity signal source individually to each of said first input circuit means; a keyboard device including an individual output circuit means for each different character located between and connected in series with said first and second input circuit means for transforming said single polarity signals into single polarity signal representations of characters by directing said single polarity signals to the output terminal thereof which corresponds to a selected character whereby the selective energization of respective ones of said series connected first and second input circuit means by the same single polarity signal produces that stable condition of operation selected to denote the presence of significant bits in those cores of the group coupled by the energized first circuit means which correspond to the bit positions in which the significant bits are present of the binary code representation of the character to which the energized second circuit means corresponds; individual first read-out circuit means coupling each respective core in a sense opposite that of said first and second input circuit means; second read-out circuit means series coupling all of said cores in a sense the same as said first read-out circuit means whereby a read-out signal successively energizing each of said first read-out circuit means coincident with the said second read-out circuit means will individually reverse the condition of operation of those cores which are in the stable condition of operation selected to denote the presence of a significant bit; and an output circuit means serially coupling all of said cores in which a pulse appears with each reversal of condition of operation of a core.

References Cited in the file of this patent

UNITED STATES PATENTS 2,774,429 Rabenda -------------- Dec. 18, 1956